United States Patent
Sumi et al.

(10) Patent No.: US 7,343,682 B2
(45) Date of Patent: Mar. 18, 2008

(54) TECHNIQUE FOR FILLING BEARING CLEARANCE OF FLUID-DYNAMIC-PRESSURE BEARING UNIT WITH OIL

(75) Inventors: Shigeharu Sumi, Kyoto (JP); Jyoichi Hiroshi, Kyoto (JP); Hironori Ando, Kyoto (JP)

(73) Assignee: Nidec Corporation, Kyoto (JP)

( * ) Notice: Subject to any disclaimer, the term of this patent is extended or adjusted under 35 U.S.C. 154(b) by 371 days.

(21) Appl. No.: 10/711,840

(22) Filed: Oct. 8, 2004

(65) Prior Publication Data

US 2005/0095159 A1    May 5, 2005

(30) Foreign Application Priority Data

Oct. 8, 2003    (JP)    ............................. 2003-349128

(51) Int. Cl.
   *B21D 53/10*    (2006.01)
   *B65B 43/42*    (2006.01)
   *B67C 3/00*    (2006.01)

(52) U.S. Cl. .................... 29/898.1; 29/898; 29/898.02; 141/51; 141/5; 141/7; 141/59; 141/65; 141/82

(58) Field of Classification Search ................... 29/898, 29/898.02, 898.1; 141/1, 4, 7, 65, 59, 67; 184/1.5, 5.1

See application file for complete search history.

(56) References Cited

U.S. PATENT DOCUMENTS 3,645,508 A * 2/1972 Balteau ...................... 366/273
5,601,125 A * 2/1997 Parsoneault et al. .......... 141/51

FOREIGN PATENT DOCUMENTS

JP    2002-005170 A    1/2002
JP    2002-213452 A    7/2002

* cited by examiner

*Primary Examiner*—Rick K Chang
(74) *Attorney, Agent, or Firm*—Volentine & Whitt, PLLC

(57) ABSTRACT

Fluid-dynamic-pressure bearing manufacturing method for more efficient and fail-safe degassing of bearing oil. Method makes it possible to prevent the generation of air bubbles in the course of an oil-charging operation that amounts to a step following degassing, and to single out the causative source of air bubbles when their generation has been detected. At the same time oil that is under a reduced-pressure environment within an oil-storing vacuum chamber is vacuum-degassed, immersed within the oil a stirrer for agitating and degassing the oil is rotated by indirect drive means, and the oil after having been degassed is supplied to a vacuum chamber where a fluid-dynamic-pressure bearing unit is retained—which has been pumped down to a pressure below the pressure within the oil-storing vacuum chamber—and is charged into the bearing clearances by raising the internal pressure of the bearing-retaining vacuum chamber.

9 Claims, 2 Drawing Sheets

TECHNIQUE FOR FILLING BEARING CLEARANCE OF FLUID-DYNAMIC-PRESSURE BEARING UNIT WITH OIL

BACKGROUND OF THE INVENTION

1. Technical Field

The present invention relates to methods of manufacturing fluid-dynamic-pressure bearing units employed as bearing devices in applications such as spindle motors for hard-disk drives, and to motors employing such fluid-dynamic-pressure bearing units.

2. Description of the Related Art

As bearings for motors in which high rotational precision is demanded—as is the case with spindle motors employed in disk drives that drive recording disks such as hard disks, and with motors for driving the polygonal mirrors of laser printers—in order to support the shaft and sleeve letting one rotate relative to the other, fluid-dynamic-pressure bearing units that employ the fluid pressure of a lubricant such as oil intervening in between the two have variously been proposed to date.

One example of a motor that employs such fluid-dynamic-pressure bearing units is illustrated in FIG. 1. This conventional dynamic-pressure-bearing employing motor is configured with a pair of radial bearings 4, 4 in between the outer circumferential surface of a shaft 2 that forms a single component with a rotor 1, and the inner circumferential surface of a sleeve 3 through which the shaft 2 is inserted and in which it is free to rotate. In between the upper surface of a discoid thrust plate 5 that projects radially outward from the outer circumferential surface of one of the end portions of the shaft 1, and the flat surface of a step recessed into the sleeve 3, as well as in between the undersurface of the thrust plate 5 and a thrust bush 6 that closes off one of the openings in the sleeve 3, the motor is also configured with a pair of respective thrust bearings 7, 7.

Consecutive micro-gaps between the shaft 2 together with the thrust plate 5 and the sleeve 3 together with the thrust bush 6 form bearing clearances, and oil 9 as a lubricating fluid is retained continuously without interruption within these bearing clearances. (This sort of oil-retaining structure will be denoted a "full-fill structure" hereinafter.)

Herringbone grooves 41, 41 and 71, 71 composed of linked pairs of spiral striations are formed in the radial bearings 4, 4 and the thrust bearings 7, 7. In response to the rotor 1 rotating, maximum dynamic pressure is generated in the center portion of the bearings, which is where the spiral-striation joints are located. Loads acting on the rotor 1 are borne by this dynamic pressure.

In a motor of this sort, a taper seal section 8 is formed alongside a portion of the sleeve 3 at its upper end, located on the motor end axially opposite the thrust bearings 7, 7, wherein the surface tension of the oil and the atmospheric pressure balance to constitute a boundary surface. This means that the oil internal pressure within the taper seal section 8 is maintained at a pressure that is essentially equal to atmospheric pressure.

One method that has been proposed as a way of charging bearings, configured as described above, with the oil 9 as retained in between the shaft 2 with the thrust plate 5 and the sleeve 3 with the thrust bush 6 is as follows. A vacuum chamber stocked with oil is pumped down to a vacuum level, wherein a stirring device is operated to agitate and degas the oil. Then a vacuum chamber in which the bearing unit is retained is pumped down to a vacuum level, following which the oil is supplied to the vacuum chamber that retains the bearing unit, so as to put an appropriate amount of oil under a reduced-pressure environment into the bearing-unit opening, including the taper seal section 8 for the bearings. Subsequently the environment within the vacuum chamber that retains the bearing unit is brought back to atmospheric pressure, thereby exploiting the pressure difference so as to charge the bearing clearances in the fluid-dynamic-pressure bearing unit with the oil.

With oil-charging methods of the sort just described, however, air that has dissolved into the oil in the course of the oil-charging procedure, or at the stage in which after assembly as a fluid-dynamic-pressure bearing is complete the bearing is incorporated into a motor and put to work, sometimes is manifested as air bubbles.

This is thought to originate in air, slight though it may be, remaining dissolved within the oil even after having undergone the degassing process, because even with the vacuum chamber being pumped down to a vacuum level, artificially creating a perfect vacuum state is impossible. Air bubbles becoming manifest during the oil-charging procedure can hinder the smooth supply of oil from the vacuum chamber that stores oil to the vacuum chamber that holds the bearing unit, or, at the stage in which the oil has arrived inside the vacuum chamber that holds the bearing unit, can foam the oil such that the oil spouts out and sticks to the bearing unit and the vacuum-chamber interior, making it necessary to wipe the oil off, and such consequences cause a drop-off in productivity.

Moreover, if the motor is run with air bubbles within the oil mixed in as they are, eventually either of two of the following problems will arise. One affects the endurance and reliability of the motor and is a problem of the air bubbles expanding in volume-due, for example, to a rise in temperature-and causing the oil to leak out to the bearing-unit exterior. The other affects the rotational precision of the motor and is a problem of incidents of vibration or a problem of deterioration from NRRO (non-repeatable runout), due to the air bubbles coming into contact with the dynamic-pressure-generating grooves provided in the bearings.

Additional problems with the bearing oil-charging method discussed above involve a stirring propeller within the oil stored inside the vacuum chamber. Via a drive train including a shaft the propeller is linked to a drive source disposed on the exterior of the vacuum chamber. If the portion of the vacuum chamber through which the shaft passes is not hermetically sealed, then when the propeller is rotated to agitate and degas the oil, leaking of oil and dissolving of air into the oil will occur. The occurrence of such problems creates management difficulties. Furthermore, in that simply stirring the oil by the rotation of the propeller alone entails an extremely lengthy degassing operation in order to purge the oil completely of the air dissolved into it, a further concern is the consequent loss in productivity in the manufacture of fluid-dynamic-pressure bearing units.

One further concern in the manufacture of fluid-dynamic-pressure bearing units is that despite the oil having undergone a degassing process as described above, in rare instances air bubbles will be generated within the oil in installing the bearing unit into a motor and putting it to work. In such instances, given that it is unclear whether the generated air bubbles remain from or were mixed in during the oil-charging procedure, or became freshly mixed-in within the oil from the motor being driven, it is difficult to single out whether the cause is an operational shortcoming in the oil-charging procedure, or is a structural defect in, or a machining-operational shortcoming in the production of, the fluid-dynamic-pressure bearing units themselves. The consequence is that inspecting/testing to determine the cause and then finding the most appropriate way to eliminate the in-mixing of air into the oil requires an inordinate amount of time.

BRIEF SUMMARY OF THE INVENTION

An object of the present invention is to obviate problems originating in air bubbles being generated within oil charged into the bearing clearances in fluid-dynamic-pressure bearing units, before such problems occur. More specifically, an object of the invention is to make available a method of manufacturing fluid-dynamic-pressure bearing units, and a motor utilizing the fluid-dynamic-pressure bearing units, in which preventing the generation of air bubbles in the course of an oil-charging operation equivalent to a step following the degassing operation is made possible, and in which specifying the causative source of air bubbles in instances in which the generation of air bubbles is detected is made possible.

With a method according to the present invention of manufacturing a fluid-dynamic-pressure bearing, in an implementation in which a degassing process done by vacuum-degassing and stirring-degassing is carried out, a drive source for rotating a stirrer is arranged on the exterior of the vacuum chamber and the stirrer is indirectly rotated, whereby a special configuration for maintaining a hermetic seal on the vacuum chamber is rendered unnecessary. This enables the configuration of the apparatus to be simplified and facilitates management of the hermetic sealing quality.

What is more, by having the reduced-pressure level of the interior of the vacuum chamber storing the oil that has undergone a degassing process—of the oil tank and associated components, which are a vacuum chamber located upstream in terms of the oil-charging procedure—be greater (in other words, in a higher vacuum condition) than the reduced-pressure level within the vacuum chamber for oil-charging, which is located downstream, in terms of the procedure, from the oil-storing vacuum chamber, then even should the charging operation be carried out with oil in which a trace amount of air is still dissolved, the air bubbles will not foam during the procedure and become manifest. These aspects of the invention thus enable the oil-charging procedure to be carried out smoothly.

It should be understood that a method for indirectly rotating the stirrer through a drive source is realizable by a drive technique based on so-called magnetic coupling.

In a further aspect of the present invention, by preparatorily heating the oil when vacuum-degassing and stirring-degassing are carried out, the viscosity of the oil is lowered so that the degassing is expedited, which enables the oil-degassing process to be carried out more efficiently and reliably. An additional benefit is that heating the oil enables volatile impurities contained in the oil to be removed.

Should air have gotten mixed into the oil in an oil-charged fluid-dynamic-pressure bearing unit once it has been incorporated into a motor, then if repeated starting and stopping of the motor gives rise to an elevation of the oil boundary surface within the bearing clearances, or if, while the starting/stopping of the motor is repeatedly carried out, the extent to which the oil boundary surface is elevated increases, either way it will be clear that the basis of the in-mixing of air into the oil lies in the rotation of the motor; in other words, it will be evident that the in-mixing of air continues to occur inasmuch as there is a problem with the structure or processing of the fluid-dynamic-pressure bearing unit. In such instances, simultaneously implementing a plurality of degassing techniques so that the oil-degassing process is carried out with maximal reliability, and meanwhile maintaining the reduced-pressure level of the oil-storing vacuum chamber relative to the reduced-pressure level of the oil-charging vacuum chamber at the relationship described above will at least make it clear that air remnant in or mixed into the oil is not due to some deficiency in the oil-charging operation that includes the degassing process step. Thus, inasmuch as the potential factors giving rise to the problem are narrowed down to a defect in either the structure or processing of the fluid-dynamic-pressure bearing unit, singling out the causative source is facilitated, enabling prompt testing to establish appropriate measures to address the problem, and enabling the implementation of those measures.

From the following detailed description in conjunction with the accompanying drawings, the foregoing and other objects, features, aspects and advantages of the present invention will become readily apparent to those skilled in the art.

DETAILED DESCRIPTION OF THE INVENTION

Figure 1:
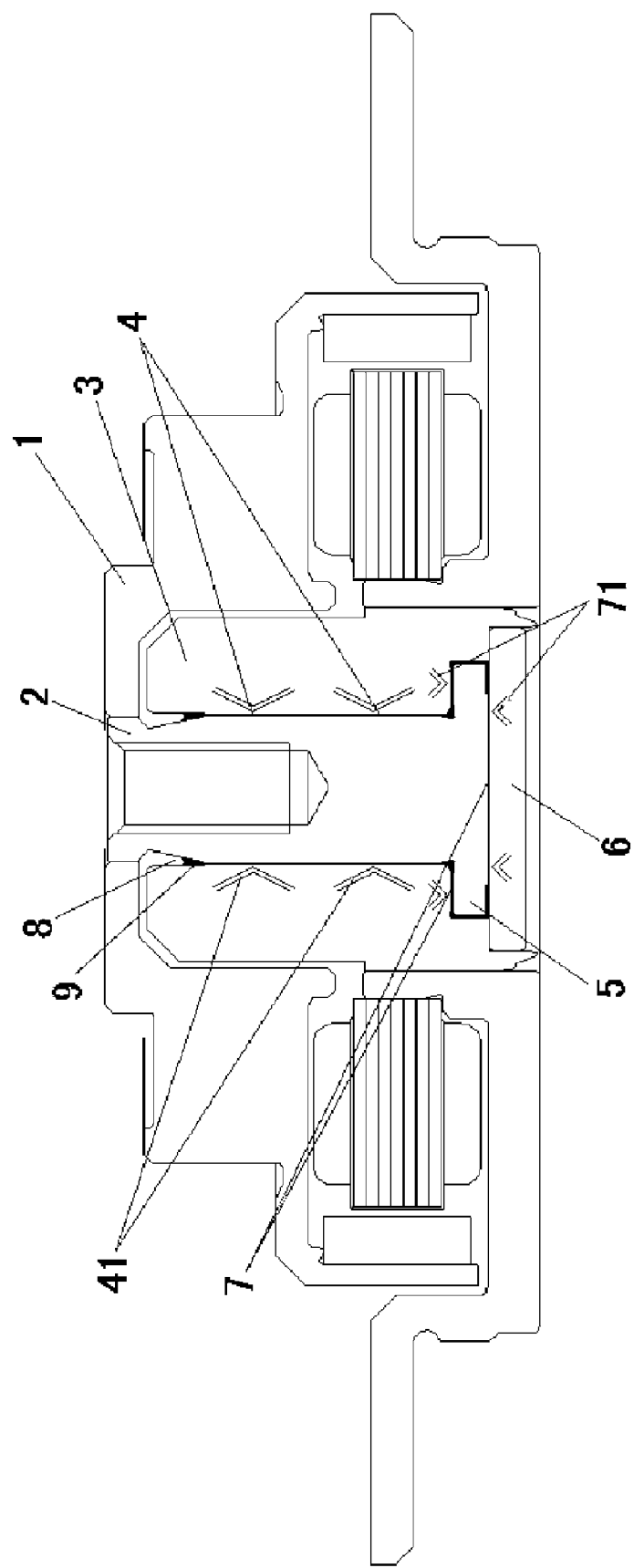
FIG. 1 is a configurational diagram of a motor that includes a fluid-dynamic-pressure bearing.
Figure 2:
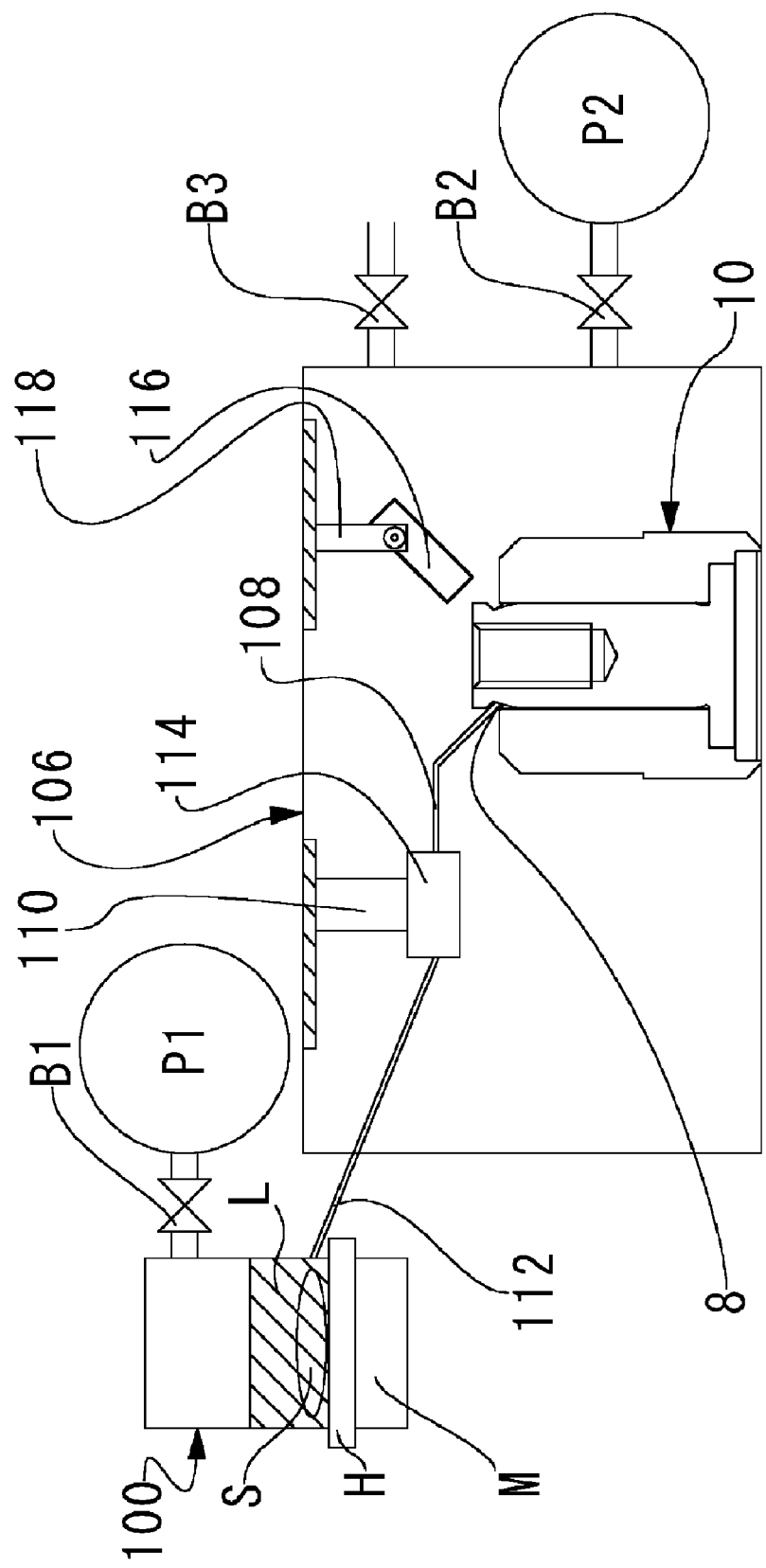
FIG. 2 is a conceptional diagram of an oil-charging apparatus that corresponds to an embodiment of the present invention.

The object of obviating problems originating in air bubbles being generated within oil charged into the bearing clearances in fluid-dynamic-pressure bearing units, before such problems occur, was realized without increasing operational man-hours needed or complicating the operational steps. The invention also accomplished the other object, which is to make it possible to single out the causative source of air bubbles in instances in which the generation of air bubbles is detected, without increasing man-hours needed or complicating the steps in the process.

Below, reference is made to the appended drawings to discuss a method of manufacturing fluid-dynamic-pressure bearing units according to the present invention. A fluid-dynamic-pressure bearing unit 10 has the same configuration as the fluid-dynamic-pressure bearing shown in FIG. 1 and therefore, the configuration thereof is not elaborated upon to avoid repetitive description.

In a method according to the present embodiment of manufacturing a fluid-dynamic-pressure bearing unit, first, a heater H is turned on to heat oil L that is stored inside a first vacuum chamber 100, which is an oil tank; the oil is heated to a temperature within a range of about 80° C. to about 100° C., preferably to be about 90° C., and a valve B1 is released to operate a vacuum pump P1 to discharge the air inside the first vacuum chamber 100 and pump the chamber down to a predetermined level of vacuum PL1. Upon confirming that the temperature of the oil L has reached about 90° C. and that the reduced-pressure level inside the first vacuum chamber 100 has reached the vacuum level PL1, a motor M, which is fitted to the first vacuum chamber 100 with the heater H interposed therebetween, is run at a rotational speed of about 600 rpm. The motor M has a rotor (not shown) on which a magnet is mounted, so that a stirrer S, immersed in the oil and made of a magnetic material, also starts to rotate attendant upon rotation of the motor M to stir the oil L. At that time, the vacuum level PL1 inside the first vacuum chamber 100 is about 100 Pa or lower, and preferably about 30 Pa; the oil L is maintained in that condition for about 30 minutes, and preferably for about 2 hours, so as to be degassed by vacuum and stirring.

Heating the oil L sufficiently when in this way performing the degassing process on the oil L using both vacuum-degassing and stirring-degassing reduces the viscosity of the oil L, making it possible to eliminate the air that has been dissolved into the oil L more efficiently and reliably than by conventional degassing processes using only vacuum-degassing and conventional degassing processes using both vacuum-degassing and stirring-degassing. Moreover, heating the oil L makes it possible to remove volatile impurities contained in the oil L. Additionally, the fact that the stirrer S for carrying out stirring-degassing is rotated by magnetic induction, or so-called magnet coupling, with the motor M, makes it easier to maintain the airtightness of the first vacuum chamber 100, in comparison with the conventional case in which oil stirring-degassing is carried out by rotating a propeller, coupled via a drive train including a shaft to a drive source disposed on the exterior of the vacuum chamber, within the oil stored inside the vacuum chamber. The stirrer S may be virgate, spherical, annular, or discoid; the stirrer S is formed of a ferromagnetic material such as martensitic or ferritic stainless steel, the surface of which is coated with a soft material such as rubber, or a synthetic resin in which a magnetic material has been blended.

Upon completing the degassing process on the oil L, a fluid-dynamic-pressure bearing unit 10 that has not yet been charged with oil is brought into a second vacuum chamber 106, which is an oil-charging vessel, through an opening, which is not shown in the figure, and installed in a predetermined position; after closing the opening, a valve B2 is released and a vacuum pump P2 is operated to discharge the air inside the second vacuum chamber 106 and inside the bearing clearances of the fluid-dynamic-pressure bearing unit 10. Then, when a reduced-pressure level PL2 that has been set in advance is reached, charging of the oil L is launched. It is also possible to pump down the second vacuum chamber 106 by using the vacuum pump P1 that is used to pump down the first vacuum chamber 100.

To charge the oil L, first, an oil fill port 108 and a movable piece 110 are translated and rotated so as to be positioned directly above the taper seal section 8 of the fluid-dynamic-pressure bearing unit 10. Thereafter, the already-degassed oil L stored inside the first vacuum chamber 100 is supplied through a feed line 112; for that purpose, a needle valve 114 (for example, a BP-107D made by Ace Giken Co., Ltd.) is operated in order to feed a predetermined amount V1 of oil into the oil fill port 108. Next, the oil L supplied from the first vacuum chamber 100 to the needle valve 114 is dripped from the oil fill port 108 into the taper seal section 8 of the fluid-dynamic-pressure bearing unit 10; then, outside air that has been made dust-free by means of a filter or the like is allowed to enter by opening a valve B3 for a predetermined duration, and the air pressure inside the second vacuum chamber 106 is raised from the reduced-pressure level PL2. At this time, the interior of the bearing clearances of the fluid-dynamic-pressure bearing unit 10 is in a hermetically-sealed state because of the oil L dripped onto the taper seal section 8 and remains at the reduced-pressure level PL2; thus, a difference in pressure arises between the interior of the bearing clearances and the raised internal pressure of the second vacuum chamber 106, causing the dripped oil L to be forced into the bearing clearances.

Next, by translating and rotating the movable part 118, a camera 116 is shifted to a position that permits the interior of the taper seal section 8 to be observed, so that the amount of oil L charged into the bearing clearances through the above-described process can be monitored. Based on the result of the observation, a determination may be made as to whether the amount of oil L charged into the fluid-dynamic-pressure bearing unit 10 is in excess or is insufficient; if the amount of the oil L charged into the bearing unit is insufficient, the requisite amount of oil to be added is determined. Then, again releasing the valve B2 as needed, the vacuum pump P2 is operated to discharge the air inside the second vacuum chamber 106 to pump it down to the reduced-pressure level PL2. Upon completing the re-pumping down, the necessary oil L is charged into the bearing clearances again in the same manner as the above-described charging process for the amount of oil V1. It should be noted that if the oil that has been charged into the bearing clearances is more than the predetermined oil charge amount, the excess portion of the oil is collected by aspirating the excess portion while using the camera 116 to confirm the boundary surface position of the oil L within the taper seal section 8.

The fluid-dynamic-pressure bearing unit 10, for which charging with the predetermined amount of oil L has thus been completed, is transferred out of the second vacuum chamber 106.

In the above-described operation of charging the oil L into the bearing clearances, it is crucial that, at the point when the pump-down is completed, the internal pressure of the first vacuum chamber 100 be lower than the internal pressure of the second vacuum chamber 106, that is, that the situation be such that reduced-pressure level PL1>reduced-pressure level PL2.

In supplying the oil L from the first vacuum chamber 100 to the second vacuum chamber 106, if the relationship between the reduced-pressure levels PL1 and PL2 of the respective vacuum chambers 100 and 106 is "reduced-pressure level PL1<reduced-pressure level PL2," that is, if the internal pressure of the first vacuum chamber 100 is higher than the internal pressure of the second vacuum chamber 106, the pressure difference will cause air remaining to some extent within the oil L to foam due to cavitation and eventually, to spout out from the oil fill port 108 into the second vacuum chamber 106. Consequently, in an implementation in which the fluid-dynamic-pressure bearing unit 10 is applied as a bearing device to a motor employed under the clean environment of a disk drive or similar device, with the oil L stuck to the surfaces after having spouted out, the oil will contaminate that type of clean environment. Such contamination makes it necessary to wipe off the interior of the second vacuum chamber 106 and the surfaces of the fluid-dynamic-pressure bearing unit 10. Moreover, if this sort of foaming phenomenon has occurred in the interior of the feed line 112, the oil L in the interior of the feed line 112 will become partitioned by the foam; if the oil L is thus partitioned, it cannot be supplied smoothly to the oil fill port 108 end of the feed line 112. Any of these problems will be a factor that will greatly degrade the productivity of the fluid-dynamic-pressure bearing unit 10.

In contrast, by arranging for the relationship between the reduced-pressure levels PL1 and PL2 of the first vacuum chamber 100 and the second vacuum chamber 106 to be, as noted above, "reduced-pressure level PL1>reduced-pressure level PL2," the oil L, while undergoing the oil-charging operation, will be sent to the vacuum chamber in which the pressure, in turn, is higher (and in which the vacuum level is lower), which fully prevents the occurrence of the foaming phenomenon. In order to establish the foregoing pressure relationship, it is desirable that the internal pressure of the second vacuum chamber 106, in which charging of the oil into the bearing clearances in the fluid-dynamic-pressure bearing unit 10 is carried out, be pumped down to 1000 Pa or less, and preferably to the approximately 100 Pa level.

Next, the fluid-dynamic-pressure bearing unit 10, for which the operation for charging the bearing with the oil L has been completed as illustrated in FIG. 1, is put into a motor, and with the fluid-dynamic-pressure bearing unit 10 being incorporated into the motor, by repeatedly starting and stopping the motor and then observing the presence/absence of movement of the boundary surface on the oil within the bearing clearances, and observing the frequency with which such movement occurs, the presence/absence of occurrences of foaming within the oil and the cause of any such occurrences are thereby checked.

Thus, in the fluid-dynamic-pressure bearing unit 10 that has been charged with the oil L, with the bearing unit 10 incorporated into the motor, should air have gotten mixed into the oil L, then if repeated starting and stopping of the motor gives rise to an elevation of the oil L boundary surface within the taper seal section 8, or if, while the starting/stopping of the motor is repeatedly carried out, the extent to which the oil boundary surface is elevated increases, either way it will be clear that the basis of the in-mixing of air into the oil lies in the rotation of the motor; in other words, it will be evident that the in-mixing of air continues to occur inasmuch as there is a problem with the structure or processing of the fluid-dynamic-pressure bearing unit. In such instances, simultaneously implementing a plurality of degassing techniques so that the process of degassing the oil L is carried out with maximal reliability, and at the same time maintaining the relationship between the reduced-pressure levels PL1 and PL2 of the first and second vacuum chambers 100 and 106 at the relationship stated above, will at least make clear that air mixed into the oil L is not due to some deficiency in the oil-charging operation that includes the degassing process step. Thus, inasmuch as the potential factors giving rise to the problem are narrowed down to a defect in either the structure of, or the machining or assembling of, the fluid-dynamic-pressure bearing unit 10, singling out the causative source is facilitated, enabling prompt testing to establish appropriate measures to address the problem, and enabling the implementation of those measures.

Although in the foregoing discussion, embodiments of a method of manufacturing a fluid-dynamic-pressure bearing in accordance with the present invention have been described, the present invention is not limited to these embodiments, and without deviating from the scope of the invention, various changes or modifications are possible; the invention is applicable to a variety of fluid-dynamic-pressure bearing configurations.

For example, a configuration was described in which the first vacuum chamber 100, where the process of degassing the oil L is carried out, and the second vacuum chamber 106, which is for oil injection, are directly linked by means of the feed line 112, but another option is to interpose a special reservoir for storing oil between the first vacuum chamber 100 and the second vacuum chamber 106. With that option, when actually charging the oil L into the bearing clearances within the fluid-dynamic-pressure bearing unit 10, by having the relationship between the reduced-pressure level in the oil reservoir and the reduced-pressure level PL2 in the second vacuum chamber 106 be "reduced-pressure level in oil reservoir>reduced-pressure level PL2 in the second vacuum chamber 106," the foaming phenomenon will not occur.

What is claimed is:

1. A method for use in the manufacturing of a fluid-dynamic-pressure bearing unit having a sleeve, and a shaft disposed within the sleeve with bearing clearance existing therebetween whereby one of the shaft and the sleeve is rotatable relative to the other, the method comprising:
    evacuating a first chamber containing oil until a first level of vacuum pressure prevails in the first chamber;
    providing within the first chamber a stirrer of a type that can be actuated remotely by a motor that is not mechanically attached to the stirrer;
    stirring the oil in the first chamber with the stirrer by actuating the stirrer remotely from outside the first chamber using the motor;
    evacuating a second chamber, in which the bearing unit is disposed, independently of the first chamber and until a second level of vacuum pressure prevails in the second chamber;
    supplying the oil from the first chamber to the bearing clearance of the bearing unit disposed in the second chamber when the first level of vacuum pressure is prevailing in the first chamber and the second level of vacuum pressure is prevailing in the second chamber; and
    subsequently increasing the pressure inside the second chamber to thereby induce the oil to spread into the bearing clearance.

2. The method according to claim 1, wherein the stirrer provided in the fist chamber comprises a magnetic material, and the stirring of the oil in the first chamber comprises rotating a magnet outside the first chamber.

3. The method according to claim 2, further comprising heating the oil as the oil in the first chamber is being stirred by the stirrer.

4. The method according to claim 1, further comprising heating the oil in the first chamber as the oil is being stirred by the stirrer.

5. The method according to claim 1, wherein the first vacuum pressure level is about 100 Pa or less.

6. The method according to claim 1, wherein the stirring of the oil with the stirrer is initiated after the first level of vacuum pressure is established in the first chamber by evacuating the first chamber.

7. The method according to claim 1, wherein the supplying of the oil from the first chamber to the bearing clearance of the bearing unit is carried out while the pressure in the second chamber is higher than the pressure in the first chamber.

8. The method according to claim 1, wherein the supplying of the oil into the bearing clearance of the bearing unit comprises feeding the oil from the first chamber via a location disposed above the location at which the oil enters the bearing clearance.

9. The method according to claim 1, wherein the second level of vacuum pressure is a higher level of pressure than the first level of vacuum pressure.

* * * * *